UNITED STATES PATENT OFFICE.

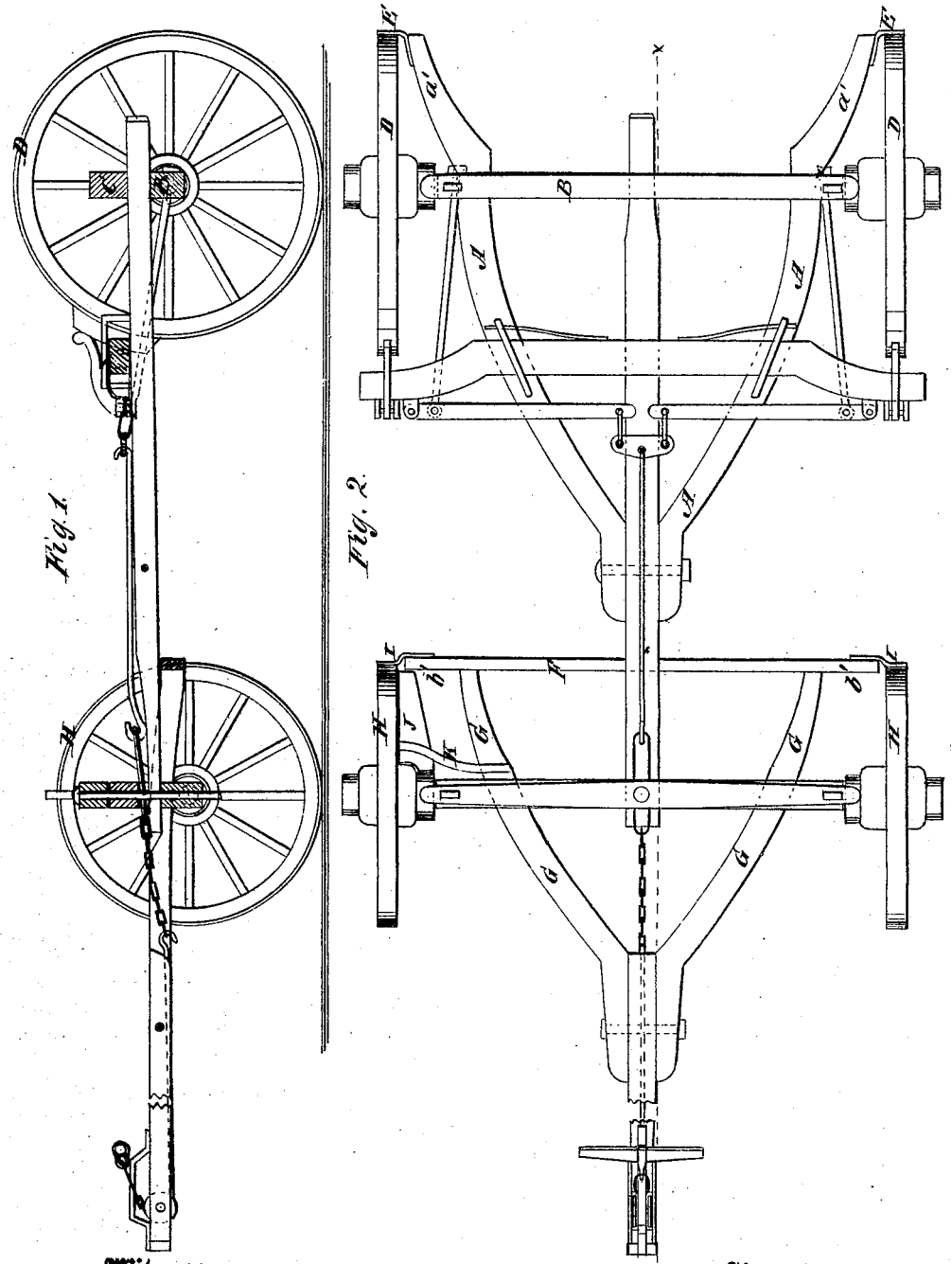

WASHINGTON BRYANT, OF BATESVILLE, ARKANSAS.

IMPROVEMENT IN FENDERS FOR VEHICLES.

Specification forming part of Letters Patent No. 149,095, dated March 31, 1874; application filed August 23, 1873.

*To all whom it may concern:*

Be it known that I, WASHINGTON BRYANT, of the town of Batesville, in the county of Independence and State of Arkansas, have invented a new and useful Improvement in Mud-Scraper for Wagon-Wheels, of which the following is a specification:

In the accompanying drawing, Figure 1 is a vertical longitudinal section of the running-gear of a wagon to which my improved mud-scrapers have been attached, taken through the line $x\,x$, Fig. 2. Fig. 2 is a top view of the same.

Similar letters of reference indicate corresponding parts.

My invention has for its object to furnish an improved device for keeping the wheels of a wagon free from mud, to prevent it from clogging the brakes or loading down the wheels. The invention consists in the arrangement of scrapers with the wheels of a wagon, as hereinafter described.

A are the rear hounds, the rear ends $a$ of which are extended in the rear of the rear axle B and bolster C, and are inclined outward, so that the rear ends of said extensions $a'$ may be near the rims of the rear wheels D. To the rear ends of the extensions $a'$ are attached scrapers E, which project across the rims of the wheels D, as shown in Fig. 2, so as to scrape off all mud that may adhere to the rims of the said wheels. F is the sway-bar, attached to the rear ends of the forward hounds G. The ends of the sway-bar F are extended nearly to the rims of the forward wheels H, and to the extensions $b'$ thus formed are attached scrapers I, which scrapers cross the rims of the wheels H, so as to scrape off any mud that might adhere to and be carried up by said wheels. To the extension $b'$ of the sway-bar F the scrapers J are attached. The same extend along the inner side of the wheel to the periphery of the inner end of the hub, so as to scrape both it and the felly, and also the spokes. The scrapers J are supported by the arms K at their forward ends. They may be applied with equal facility to the rear wheels.

Having thus described my invention, I claim as new and desire to secure by Letters Patent—

The plates J, in combination with the wheel H, and arranged to scrape the hub and spokes, and supported in position by any suitable means, as shown and described.

WASHINGTON BRYANT.

Witnesses:
    D. McELVAINE,
    WM. H. BERRY.